Feb. 13, 1923.
L. G. SCHWEINEBRATEN
ROTARY CALKING TOOL
Filed Apr. 18, 1921
1,445,415
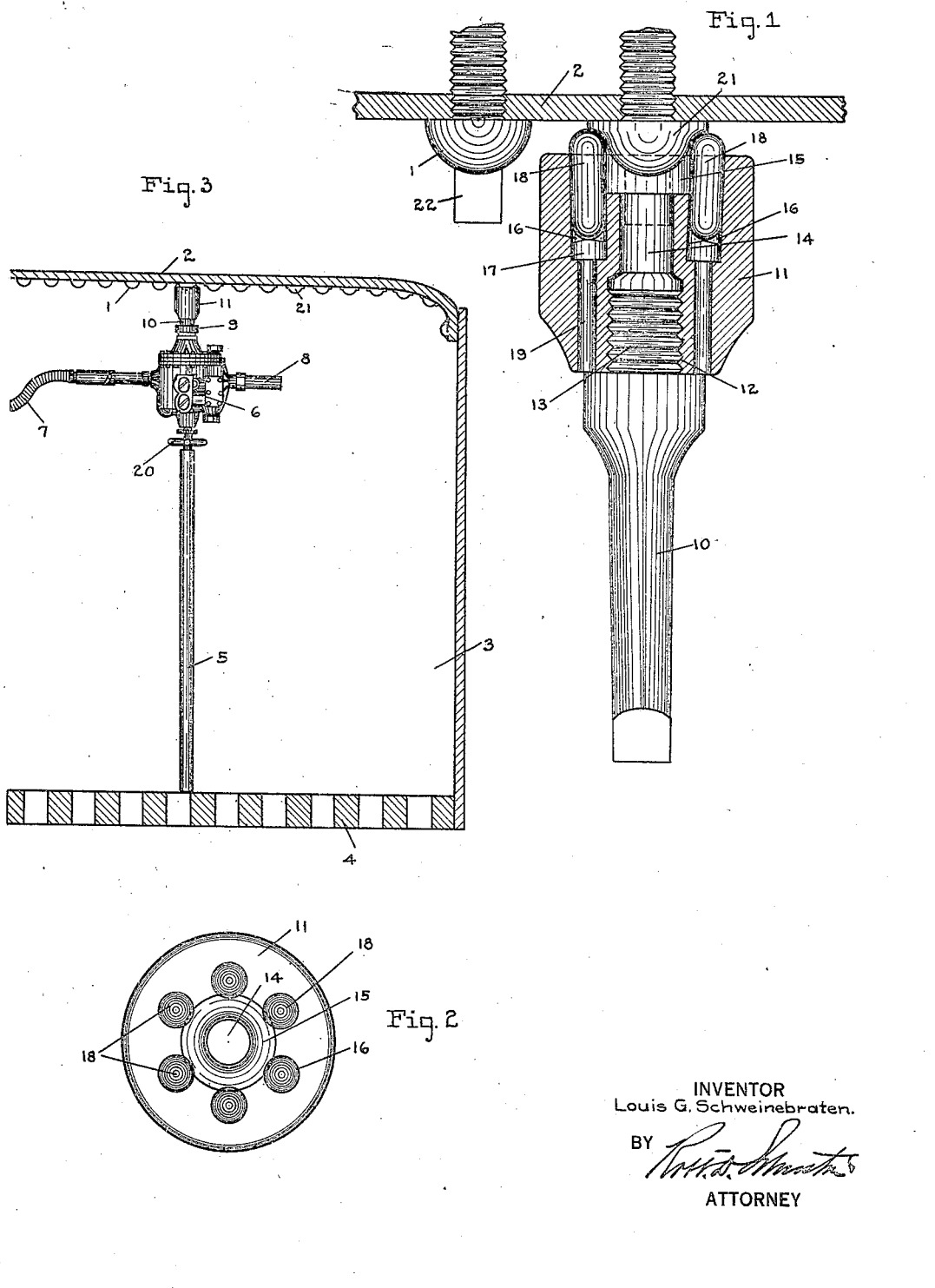
INVENTOR
Louis G. Schweinebraten.
BY
ATTORNEY Patented Feb. 13, 1923.

1,445,415

UNITED STATES PATENT OFFICE.

LOUIS G. SCHWEINEBRATEN, OF BIRMINGHAM, ALABAMA.

ROTARY CALKING TOOL.

Application filed April 18, 1921. Serial No. 462,458.

*To all whom it may concern:*

Be it known that I, LOUIS G. SCHWEINE-BRATEN, a citizen of the United States of America, residing at Birmingham, in the county of Jefferson and State of Alabama, have invented certain new and useful Improvements in Rotary Calking Tools, of which the following is a specification.

My invention relates to a rotary calking tool which is especially designed for use in calking crown sheet bolts of boilers and the like where it is impractical to use the calking hammers by reason of the fact that the calking of one bolt head tends to loosen and cause adjacent calked bolt heads to leak.

My invention is especially adapted to be used with the generally available compressed air motors so that it can be conveniently handled and applied to its work.

My invention consists especially in the provision of a tool head having an annular series of sockets opening through its end and adapted to receive loosely rotatable calking pins which have a rounded working end. As the tool head is rotated these pins travel around the bolt head and expand its rim until it is spread substantially and pressed tightly against the crown sheet so as to effect a reliable and permanent steam tight joint and this is accomplished quickly and reliably without disturbing the calked joints previously formed on adjacent bolts.

It is a further feature of my invention that the pins are reversible and that they transmit their end thrust to taper tool steel bearing blocks detachably seated in the bottom of their sockets.

A further feature of my invention is the providing of the tool with a deeply countersunk recess surrounded by the pins and adapted to receive the bolt head and its tool shank.

The advantages of my invention and the manner of its construction and operation will be better understood by reference to the detailed description and to the appended claims which follow, reference being had to the accompanying drawings which illustrate only what I consider the preferred embodiment of my invention, in which:—

Fig. 1 shows the tool in vertical cross section at work.

Fig. 2 is an end elevation of Fig. 1; and

Fig. 3 is a partial view through a fire box showing the tool at work with its air motor drive and stand assembled.

Similar reference numerals refer to similar parts throughout the drawings.

In Fig. 3 I illustrate my appliance in use calking the bolts 1 in the crown sheet 2 of the fire box 3 which has a grate 4 upon which the stand or bar 5 rests. Upon this bar is mounted an air motor 6 of any suitable type having an air feed pipe 7, a handle 8 and a tool chuck 9. I show mounted in this tool chuck the shank 10 of the calking tool head 11. This tool head has in its base a threaded socket 12 which receives a reduced screw shank 13 on the upper end of the shank 10. The tool head is substantially cylindrical in shape and is provided with a longitudinal central bore 14 which is enlarged at the upper end of the tool head to form the circular bolt head seat 15. Surrounding this seat 15 I drill or otherwise form a series of pin seats 16 which are inclined at a slight outwardly diverging angle as they approach the working end of the tool head. These seats are intersected by the seat 15 if necessary and each is provided in its bottom end with a tool steel tapered bearing block 17 upon which is adapted to bear the inner end of its respective calking pin 18. These pins fit snugly but are free to turn in their respective seats 16 and their ends are rounded and project appreciably beyond the working end of the tool head. The pins are preferably rounded similarly at both ends so that they can be taken out of their seats and reversed, thus enabling both ends to be used in the calking work. I provide apertures 19 drilled through the lower end of the tool head 11 through which, after unscrewing the shank 10, a tool can be inserted to dislodge and drive out the bearing blocks 17.

The tool having been assembled and constructed in the manner described, is applied to the work as shown in Figs. 1 and 3, and as the air motor rotates the shank 10 the feed screw 20 is turned to feed the tool to the work. The result is that the pins, as they ride about the rounded bolt head 1 generally deform it from its hemi-spherical design as shown at 1 to the calked shape shown at 21, in Fig. 1, and in thus deforming the bolt head it is spread and forced against the crown sheet 2 in such manner that a most effective and steam tight calked joint is obtained. A square head or tool grip 22 on the bolt heads is adapted to be received freely in the bore 14 of the tool head as the latter rotates, while the depth and width of the bolt head seat 15 is ample to receive the bolt head until the calking operation is completed. The head or grip 22 is usually burned off of the bolt head after the bolt has been screwed in. It is shown merely to illustrate that the rivet head can be calked with my improved tool whether or not the grip has been burned off. The tool operates very rapidly and effectively to calk the bolt heads and does not disturb the crown sheet or affect previously calked joints.

The number of calking pins employed may be varied but to better balance the tool at its work not less than three equally spaced pins should be used and, of course, all disposed equidistant from the axis of the tool head. It is only essential that the pins project sufficiently beyond the tool head opposite the bolt or rivet head, to enable the pins to follow their work down until the joint is calked. I obtain a stronger tool by countersinking the head 11 to receive the bottom rivet head as by this means the calking pin can work with a minimum projection from its seat bearing.

Having thus described my invention, but without intending to limit myself to the specific details of construction shown, what I claim, is:—

1. A calking tool, comprising a tool head adapted to be rotated and provided with a series of spaced calking pins rotatably mounted in an end of the tool head and disposed each to engage with its outer end the margin of a bolt or rivet head to be calked.

2. A rotary tool for calking bolt and rivet heads, comprising a tool head provided with a seat to receive the head of the bolt or rivet to be calked, and rotatable pins arranged marginally about said seat and adapted to engage with their ends the margin of a bolt or rivet head in said seat.

3. A rotary tool for calking bolt and rivet heads, comprising a tool head having a countersunk central axially disposed recess and a series of spaced seats disposed lengthwise of the head and surrounding said recess, and round calking pins loosely and rotatably mounted in and projecting endwise of the tool head from said seats and adapted to engage the margin only of the rivet head to be calked.

4. A rotary calking tool comprising a tool head having therein a series of pin seats inclined slightly outwardly from the axis of the tool head, and a series of spaced pins rotatably and loosely mounted in and having rounded calking heads projecting from said seats and spaced from the axis of the head to engage the marginal edge of the bolt or rivet head to be swaged.

5. A rotary calking tool as described in claim 1, in which the pins are straight cylindrical steel pins rounded at both ends and reversible in the tool head.

6. A rotary calking tool as described in claim 3, in which the pin seats diverge towards their open ends.

7. A rotary calking tool as described in claim 3, in which the tool head has a central countersunk recess which intersects the inner edges of the outer ends of said pin seats.

8. A rotary calking tool comprising a shank, a tool head having a series of spaced tool seats bored endwise into the head and disposed to intersect a circle concentric with axis of the tool head, and a series of loose cylindrical pins rotatably seated in and having a rounded end projecting from said seats, said pin ends being inclined outwardly slightly relatively to the tool axis and spaced therefrom to engage the bolt or rivet head to be calked near its marginal edge.

9. A rotary calking tool as described in claim 8, in which at least three pin seats and pins are provided equi-distantly spaced from each other and the axis of the tool.

In testimony whereof I affix my signature.

LOUIS G. SCHWEINEBRATEN.

Witness:
NOMIE WELSH.